(No Model.)
A. GOODHART & G. HEMMINGER
HARROW.
No. 270,417. Patented Jan. 9, 1883.
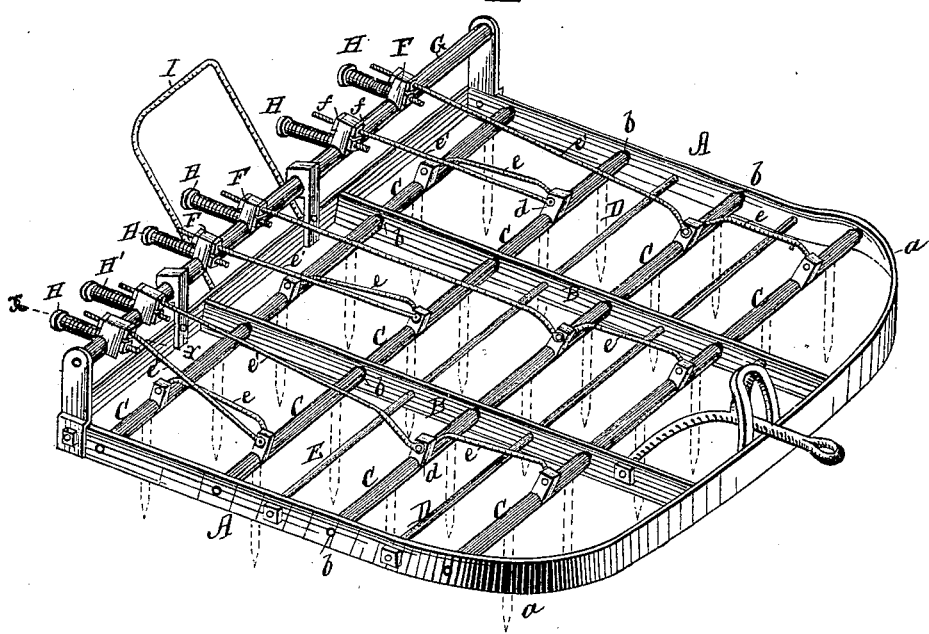
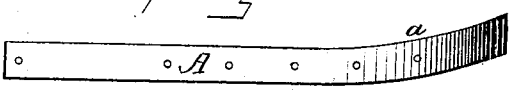
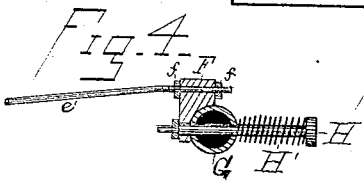 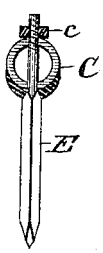
WITNESSES:
N. B. Brown
Colon C. Kernon
INVENTOR:
Alex. Goodhart
George Hemminger
BY 
ATTORNEYS.

UNITED STATES PATENT OFFICE.

ALEXANDER GOODHART AND GEORGE HEMMINGER, OF CARLISLE, PA.

HARROW.

SPECIFICATION forming part of Letters Patent No. 270,417, dated January 9, 1883.

Application filed September 19, 1882. (No model.)

*To all whom it may concern:*

Be it known that we, ALEXANDER GOODHART and GEORGE HEMMINGER, of Carlisle, in the county of Cumberland and State of Pennsylvania, have invented a new and useful Improvement in Harrows; and we do hereby declare that the following is a full, clear, and exact description of the same, reference being had to the accompanying drawings, forming part of this specification.

This invention relates to improvements in harrows, having for its object to enable the varying the angle of presentation of the teeth to the line of draft or the ground, to allow the yielding of the teeth when coming into contact with an obstruction or obstructions to prevent the accidental breaking of the same, and to obviate strain upon the team and expedite or facilitate the operation of the harrow.

The invention consists in the employment, in connection with toothed beam-sections adapted to turn upon bearings, of coupling rods or bars connecting the rear and front beams to the middle beams, and the middle beams to couplings mounted upon supports and spring-rods, substantially as hereinafter more fully set forth.

In the accompanying drawings, Figure 1 is a perspective view of our improved harrow. Fig. 2 is a view of a broken-away portion of the upturned forward end of the harrow-frame. Fig. 3 is a detailed front or side view of one of the harrow-teeth and a section of its beam through which it passes. Fig. 4 is a detailed cross-section on the line $x\ x$ of Fig. 1.

In carrying out our invention we employ a frame, A, having bars B extending through it from end to end, at suitable intervals apart, and secured thereto, dividing it up into compartments, within each of which is hung a separate series of tooth-beams, C C C. The sides of the frame A are suitably braced together by means of nutted rods D. The frame A has an upturned forward portion, $a$, as seen in Figs. 1 and 2, the purpose of which is to enable it to readily ride over obstructions and to work in rough and rocky ground, in addition to elevating the point of application of the draft to cause the pulling power to be exerted in a horizontal plane to overcome the lifting tendency of the harrow, and thus lessen the strain on the horses or team. The beams C are made hollow, with their ends bearing upon short axles or studs, $b$, fixed to the bars B and the sides of the frame A to allow them to turn thereon. To these beams or tubular sections C are connected the teeth E, each tooth being triangular in cross-section and pointed at its lower end, and having a cylindrical screw-threaded upper end, which passes through apertures in the hollow beams C, to which it is nutted, as at $c$, Fig. 3. This form of tooth provides three cutting-edges, adapting it to be presented for use in each of three different ways and to render it self-sharpening. The object of adapting the beams or sections C to turn is to permit their teeth to escape or free themselves from obstructions without breaking or damaging the same. On the upper surface of each beam-section is provided a fixed plate or shoulder, $d$, the plates or shoulders of the rear beam-sections and those of the front beam-sections being connected respectively to the adjoining ones of the middle beam-sections by a coupling rod or bar, $e$, while the plates of the middle beam-sections are connected by rods $e'$ to spring-couplings F F, the rods passing through and nutted, as at $ff$, on each side of the couplings. These couplings F F are fitted upon a common rod or bar, G, supported in bearings or uprights fastened to the frame A. The couplings are not secured directly to said bar, but are connected to rods H, passed through the rod or bar G, said rods H having springs H' coiled around them, or otherwise fitted thereto, so as to enable their outer ends to bear against heads or shoulders on the rods H and against the rod G.

From the foregoing it will be seen that by tightening the nuts $f$ on the rods $e'$ the beam-sections can be turned so as to change the angle of presentation of the teeth to the line of draft or the ground, as may be desired, and that in the event the teeth come in contact with an obstruction or obstructions the couplings F of the beam-rods will yield or be forced rearward, allowing the teeth to free themselves and causing the compression of the springs H'.

The instant the obstructed teeth get free the recoil of the compressed springs H' will return them to their original or working position.

I is the handle for guiding the harrow, suitably secured to the frame A thereof.

We are aware that in harrows having pivoted tooth-bars it is old to adapt the teeth to readily yield, without breaking, to obstructions, and to render the tooth-bars adjustable, according to the angle of presentation to the ground required.

Having thus described our invention, what we claim as new is—

In a harrow, the combination, with the toothed beam-sections adapted to turn upon bearings, of the coupling rods or bars $e$, connecting the rear and front beams to the middle beams, the connecting-rods $e'$, couplings F, support or rod G, and spring-rods H H', substantially as and for the purpose described.

ALEXANDER GOODHART.
   GEO. HEMMINGER.

Witnesses to both signatures:
 J. R. BIXLER,
 TOBIAS MILLER.